R. REYNOLDS, Jr.
Cotton Gin.
No. 3,425.
Patented Feb. 2, 1844.
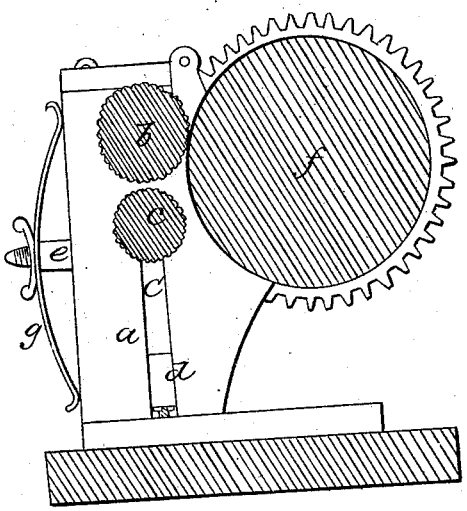
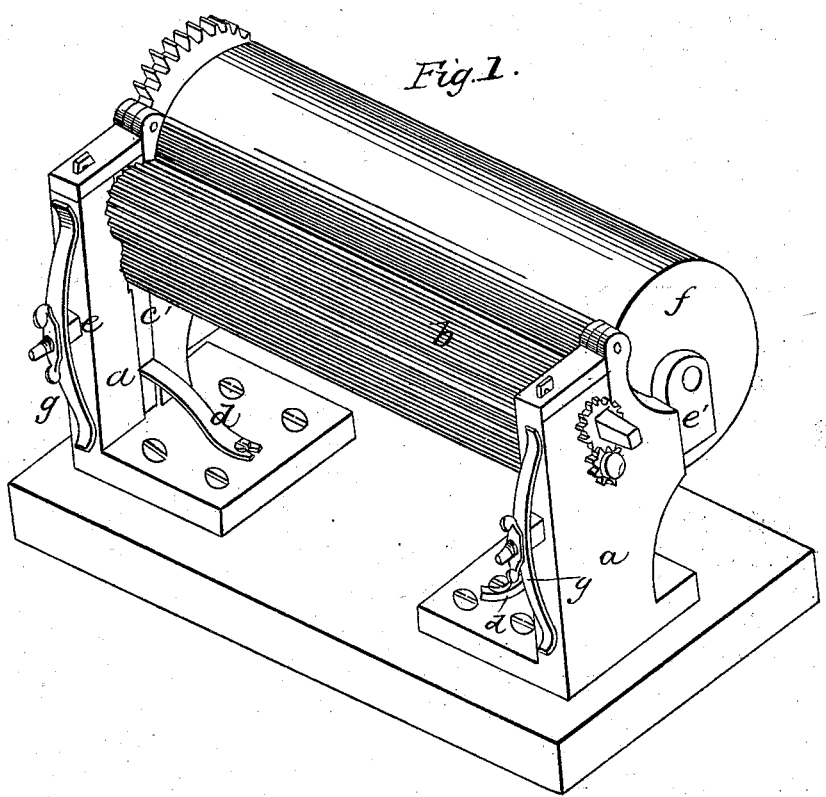

UNITED STATES PATENT OFFICE.

RICHARD REYNOLDS, JR., OF BEAUFORT, SOUTH CAROLINA.

IMPROVEMENT IN ROLLER COTTON-GINS.

Specification forming part of Letters Patent No. 3,425, dated February 2, 1844.

*To all whom it may concern:*

Be it known that I, RICHARD REYNOLDS, Jr., of the town and district of Beaufort, and State of South Carolina, have invented a new and useful Improvement in Roller Cotton-Gins; and I do hereby declare that the following is a full, clear, and exact description thereof, reference being had to the accompanying drawings, which form a part of this specification, in which—

Figure 1 is an isometrical view; Fig. 2, a cross-section.

The nature of my invention consists in the arrangement of three rollers for the more perfect cleaning of long-staple cotton.

The following is a description of the machine: In a frame consisting of two upright pieces, $a$, and connected at the bottom by a plank, to which they are secured, are combined three rollers. One of these rollers, $b$, is permanently sustained in the frame. This in a full-sized machine should be about seven-eighths of an inch in diameter. Just below this another roller, $c$, is situated, having its bearing in boxes $c'$, that slide up and down in the frame. This is kept pressed up against that above it by springs $d$, that the boxes rest on, and which are made adjustable at pleasure. There is a square mortise made through the uprights at right angles to the rollers, and horizontal, through which square rods $e$ pass, on one end of which a bearing, $e'$, is made to receive the journals of a large roller, $f$, about three inches and a half in diameter. On the other ends of each of the rods there is a spring, $g$, which draws the roller $f$ toward the two small ones. The strength of this spring can be tempered by a screw on the end of the rod. The two small rollers are fluted and the cotton is fed in between them, the springs yielding if there is a large quantity fed in at a time. The cotton is then carried up between the upper roller and the large one behind it. The rollers $b$ $c$ are so small that they present a very obtuse-angled space between them, which prevents the cotton-seed from being crushed and drawn in while the cotton is drawn out between the upper roller and the large one behind without injuring the staple, and with much greater rapidity, and straighter than those now in common use.

I do not claim as my invention the employment of three rollers together, as this has been done for barring wool and for other purposes; but What I do claim as my invention, and desire to secure by Letters Patent, is—

The manner in which I have arranged the three rollers $b$, $c$, and $f$, so that the cotton shall enter between the small rollers $b$ and $c$, and then pass between the roller $b$ and large roller $f$, by having them so arranged that the rollers $c$ and $f$ are pressed by the springs against the roller $b$, as herein described.

R. REYNOLDS, JR.

Witnesses:
 HENRY MCKEE,
 B. K. BYTHEWOOD.